(12) United States Patent
Shanmugam et al.

(10) Patent No.: US 10,069,897 B2
(45) Date of Patent: Sep. 4, 2018

(54) INCREASING AN EFFICIENCY OF A FILE TRANSFER BY USING MULTIPLE COMMUNICATION RESOURCES

(71) Applicant: Verizon Patent and Licensing Inc., Arlington, VA (US)

(72) Inventors: Sankar Shanmugam, Dayton, NJ (US); Sivagnanalingam Sivaganesh, Belle Mead, NJ (US); Moorthy Sengottaiyan, Somerset, NJ (US); Manmeet Kaur, Manalapan, NJ (US); Muhammad Salman Ali, Old Bridge, NJ (US); Petri Virkkula, Kendall Park, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 120 days.

(21) Appl. No.: 15/094,613

(22) Filed: Apr. 8, 2016

(65) Prior Publication Data
US 2017/0295218 A1    Oct. 12, 2017

(51) Int. Cl.
*H04L 29/08* (2006.01)
*H04L 12/26* (2006.01)
*H04L 12/801* (2013.01)
*G06F 17/30* (2006.01)
*H04L 12/919* (2013.01)

(52) U.S. Cl.
CPC ............ *H04L 67/06* (2013.01); *G06F 17/301* (2013.01); *H04L 43/0888* (2013.01); *H04L 47/16* (2013.01); *H04L 47/19* (2013.01); *H04L 47/765* (2013.01); *H04L 67/14* (2013.01)

(58) Field of Classification Search
CPC ..... H04L 67/00–67/20; H04L 43/08–43/0876; H04L 47/00–47/80; G06F 17/00–17/301
See application file for complete search history.

(56) References Cited

U.S. PATENT DOCUMENTS

| | | | | |
|---|---|---|---|---|
| 8,150,914 B1* | 4/2012 | Taneja | ..................... | H04L 67/06 709/203 |
| 8,635,130 B1* | 1/2014 | Smith | ..................... | G06Q 40/04 705/35 |
| 2002/0188748 A1* | 12/2002 | Blackwell | ................ | H04L 29/06 709/232 |
| 2004/0255048 A1* | 12/2004 | Lev Ran | ................. | G06F 9/546 709/249 |
| 2011/0225302 A1* | 9/2011 | Park | ..................... | H04L 65/4084 709/227 |
| 2012/0084333 A1* | 4/2012 | Huang | .............. | G06F 17/30174 707/827 |

(Continued)

*Primary Examiner* — Clayton R Williams (57) ABSTRACT

A device may receive an indication to establish a communication session between a first device and a second device for a file transfer. The device may receive, from the second device, metadata. The metadata may be used to identify files of a set of files. The device may identify the files for transfer from the second device to the first device based on the metadata. The device may cause multiple communication sessions to be established between the first device and the second device. The multiple connections may be used to transfer the files from the second device to the first device. The device may receive, from the second device, the files. The files may be received via the multiple communication sessions.

20 Claims, 7 Drawing Sheets

(56) References Cited

U.S. PATENT DOCUMENTS

| | | | |
|---|---|---|---|
| 2012/0271880 A1* | 10/2012 | Sachdeva | H04W 4/003 709/203 |
| 2012/0331111 A1* | 12/2012 | Wu | H04W 28/065 709/219 |
| 2014/0258365 A1* | 9/2014 | L'Heureux | H04L 69/16 709/203 |
| 2015/0188969 A1* | 7/2015 | Boshev | H04L 65/602 709/203 |
| 2016/0261504 A1* | 9/2016 | Sung | H04W 24/08 |

* cited by examiner

INCREASING AN EFFICIENCY OF A FILE TRANSFER BY USING MULTIPLE COMMUNICATION RESOURCES

BACKGROUND

A device, such as a user device, may perform a file transfer. The file transfer may include transmitting a file (e.g., a resource for storing data) over a network, such as the Internet. When transmitting the file, the user device may use a protocol, such as file transfer protocol (FTP) or hypertext transfer protocol (HTTP), to transfer the file over the network. The file transfer may include uploading the file to and/or downloading the file from a file server. For example, the device may upload the file by transmitting the file to the file server. As another example, the device may download the file by receiving the file from the file server.

DETAILED DESCRIPTION OF PREFERRED EMBODIMENTS

The following detailed description of example implementations refers to the accompanying drawings. The same reference numbers in different drawings may identify the same or similar elements.

A user device, such as a smartphone or a tablet, may store files. The files may include one or more files stored at a specific location. A user may have a first user device and a second user device, such as when the user purchases the second user device to replace the first user device. In some cases, the user may want to transfer files from the first user device to the second user device to have access to the files via the second user device. As another example, a first user may want to share files stored on a first user device with a second user device belonging to a second user.

The user may employ various techniques for transferring the files from the first user device to the second user device. For example, the user may transfer the files via a third user device, such as a personal computer or a removable storage device. The user may employ this technique by transferring files from the first user device to the third user device and then from the third user device to the second user device. This decreases efficiency of transferring the files from the first user device to the second user device by having to transfer the files via the third user device. In addition, this technique may present the user with technical difficulties, such as when the first user device and the second user device are executing software (e.g., an operating system) different from the third user device.

As another example, the user may transfer the files from the first user device to the second user device via a wide area network (WAN) (e.g., a long term evolution (LTE) network). This consumes network resources of the WAN, particularly when the transfer includes a large quantity of files (e.g., in the case of transferring audio files, video files, photo files, call log files, contact list files, or the like). As another example, the user may take the first user device and the second user device to a third party, such as a network operator, to have the third party transfer the files from the first user device to the second user device. This consumes time resources for the user by having the user take the first user device and the second user device to the network operator.

Implementations described herein enable a first user device and a second user device to transfer files using multiple communication resources (e.g., multiple read/write blocks, multiple send/receive socket buffers, multiple transmission control protocol/internet protocol (TCP/IP) connections, or multiple threads of execution). Furthermore, implementations described herein may dynamically adjust the use of the multiple communication resources based on a metric associated with the file transfer, such as a file transfer rate. In this way, the first user device and the second user device may decrease a total file transfer time for the file transfer, thereby increasing an efficiency of the file transfer.

Figure 1A:
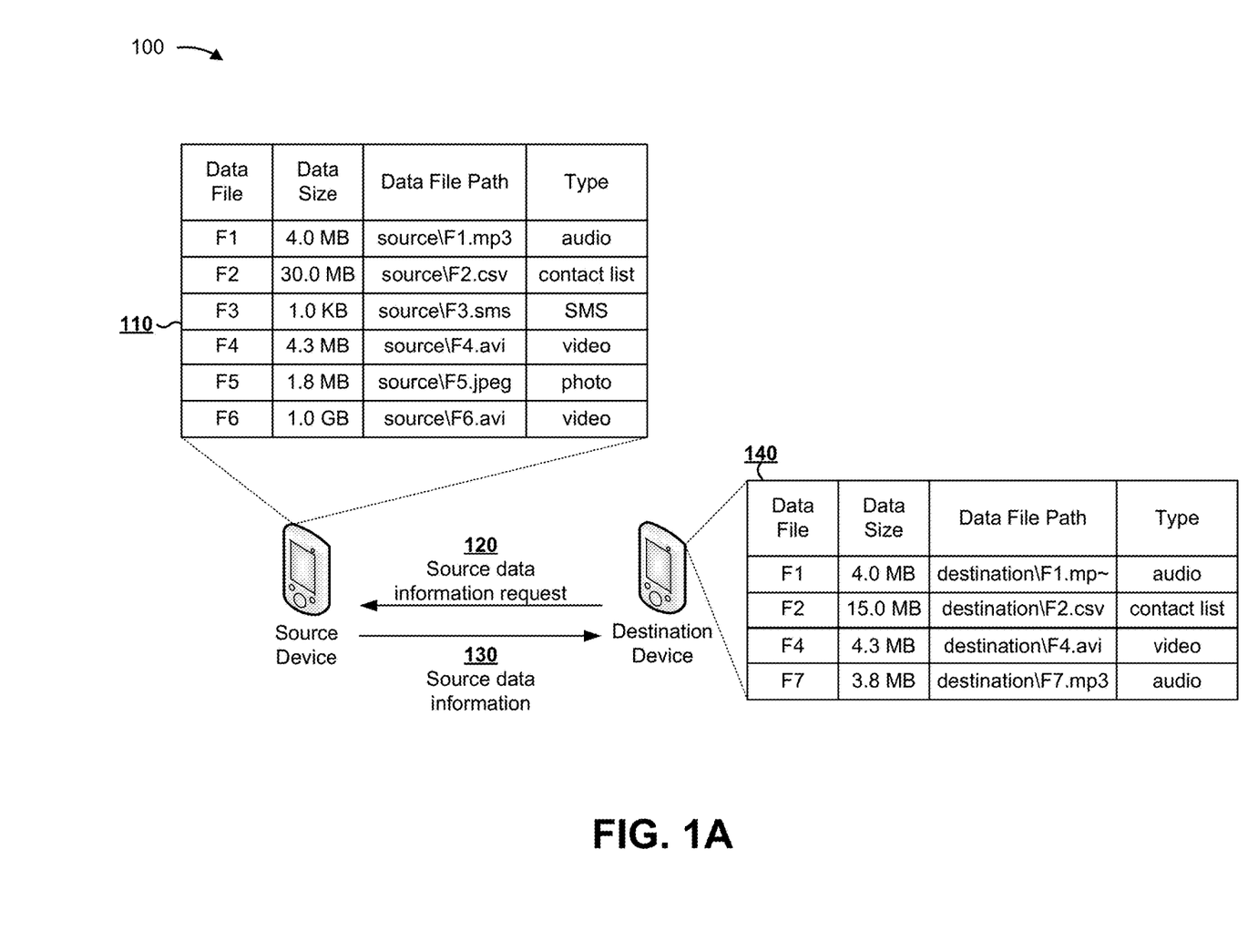
FIGS. 1A-1D are diagrams of an overview of an example implementation described herein.

FIGS. 1A-1D are diagrams of an overview of an example implementation 100 described herein. As shown in FIG. 1A, and by reference number 110, a source device (e.g., a user device, such as a smartphone or a tablet) may store source metadata associated with a set of source files stored on the source device. For example, and as shown, the source metadata may include source file identifiers (e.g., "F1" through "F6"), may indicate a size of the source files (e.g., a quantity of bytes, kilobytes (KB), megabytes (MB), or gigabytes (GB)), may indicate a source file path of the source files on the source device (e.g., a path that specifies a location where the file is stored), and/or may indicate a file type of the source files (e.g., shown as "audio," "contact list," short message service ("SMS") messages, "video," and "photo").

As shown by reference number 120, a destination device (e.g., a user device, such as a smartphone or a tablet) may request the source metadata from the source device. For example, the destination device may request the source metadata via a connection established with the source device. As shown by reference number 130, the destination device may receive the source metadata from the source device. For example, the destination device may receive the source metadata via the connection established with the source device. In some implementations, the destination device may use the source metadata to identify source files to request, as described below.

As shown by reference number 140, the destination device may store destination metadata (e.g., metadata associated with a set of destination files that the destination device is storing). For example, and as shown, the destination metadata may include destination file identifiers (e.g., "F1," "F2," "F4," and "F7"), may indicate a file size of the destination files, may indicate a destination file path of the destination files, and/or may indicate a file type of the files (e.g., shown as "audio," "contact list," and "video").

Figure 1B:
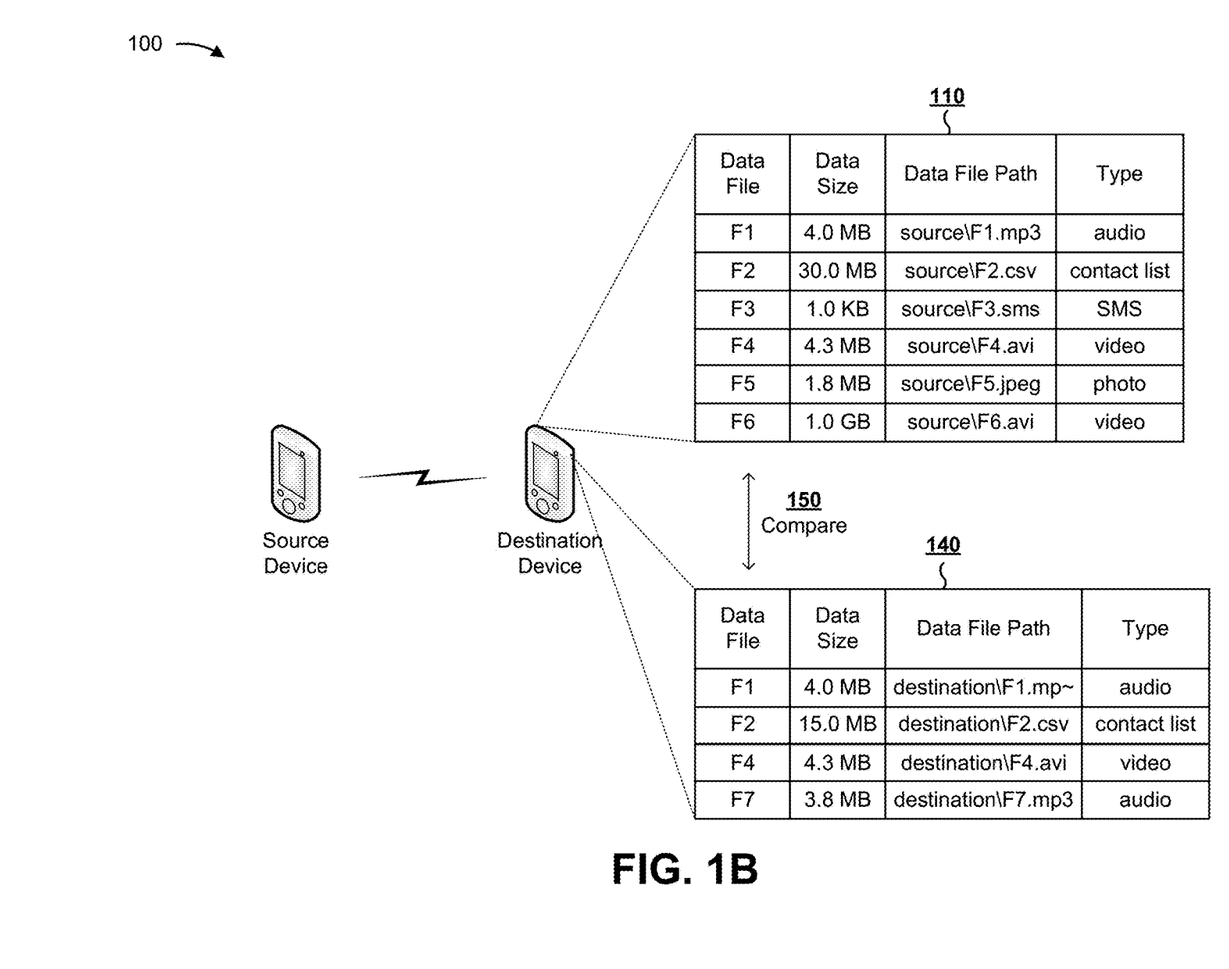

As shown in FIG. 1B, and by reference number 150, the destination device may identify source files to request from the source device by comparing the source metadata and the destination metadata. For example, the destination device may identify source files F3, F5, and F6 because those source files are not stored by the destination device as destination files. In this way, the destination device may prevent identical files from being transferred, which conserves network resources and communication resources of the source device and the destination device. For example, the destination device may not request file F4 because file F4 is already stored by the destination device.

As another example, the destination device may identify source file F1 based on destination file F1 having an improper or mismatching file extension (e.g., shown as ".mp~," rather than ".mp3," which may indicate that destination file F1 is damaged or corrupted). As another example, the destination device may identify source file F2 based on destination file F2 and source file F2 having different file sizes.

Figure 1C:
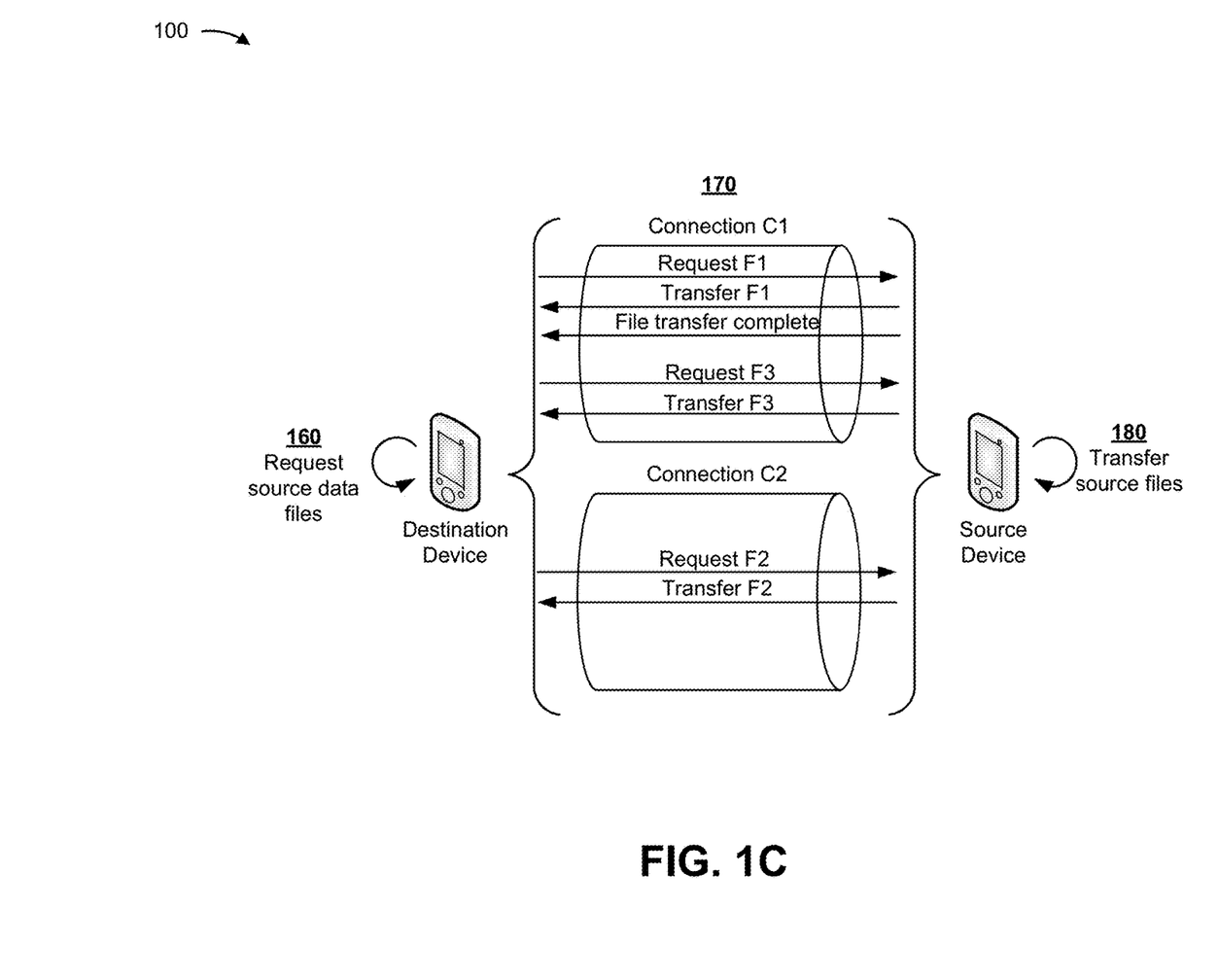

As shown in FIG. 1C, and by reference number 160, the destination device may request the source files from the source device. As shown by reference number 170, the destination device may request the source files via multiple connections (e.g., communication sessions) between the destination device and the source device. For example, the destination device may simultaneously request source file F1 via connection C1 and source file F2 via connection C2. In addition, as shown by FIG. 1B, the destination device may request source file F3 via connection C1. As further shown, the destination device may request source file F3 via connection C1 following completion of the file transfer for source file F1. As shown by reference number 180, the source device may transfer the source files via the connections, as requested by the destination device.

Figure 1D:
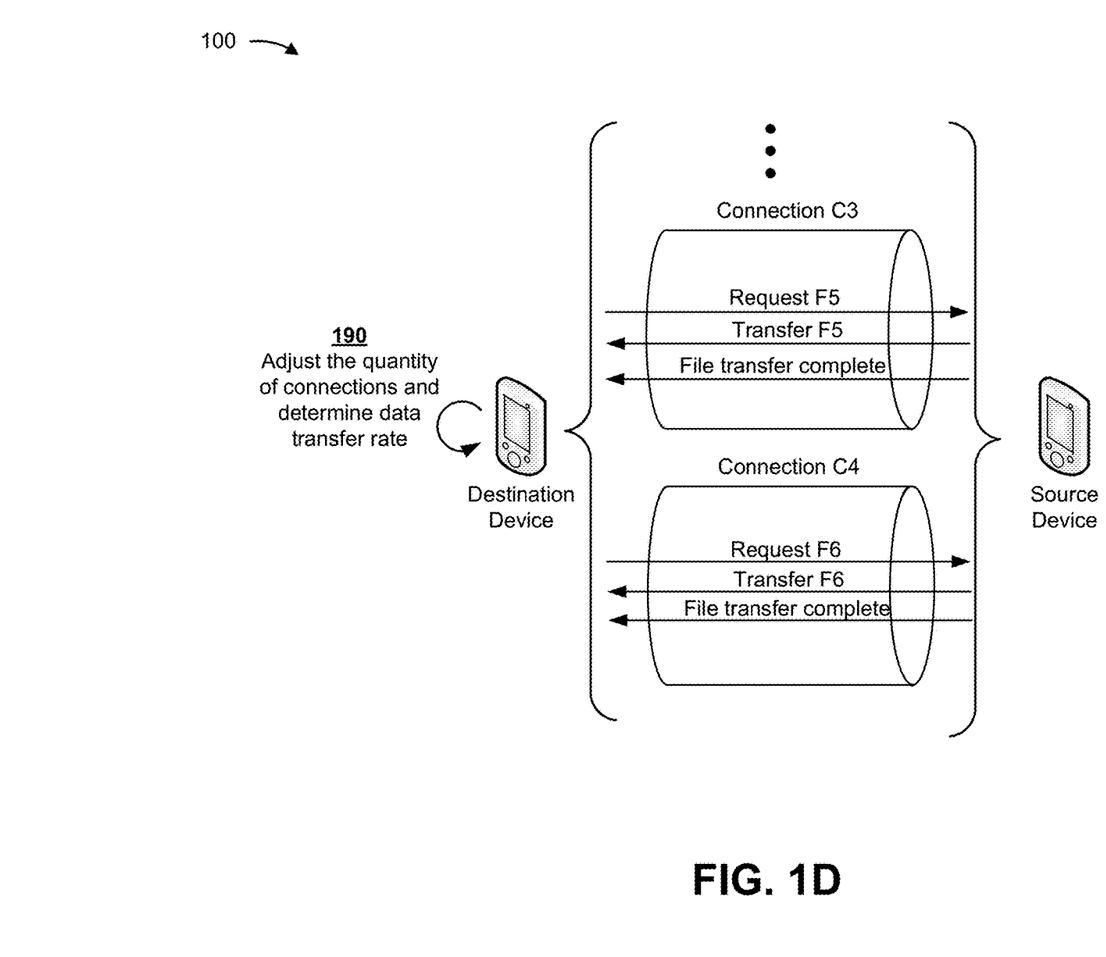

As shown in FIG. 1D, and by reference number 190, the destination device may adjust the quantity of connections during the file transfer and may determine the file transfer rate (e.g., a quantity of files per unit of time, such as megabytes per second (MBps), transferred between the source device and the destination device). For example, the destination device may increase the quantity of connections between the destination device and the source device by adding connection C3 and requesting source file F5 via connection C3, which the source device may transfer via connection C3.

Assume, for example, that the destination device determines that the file transfer rate increases with the addition of connection C3. Based on the file transfer rate increasing, the destination device may increase the quantity of connections between the destination device and the source device by adding connection C4 and requesting source file F6 via connection C4, which the source device may transfer via connection C4. Assume instead, for example, that the destination device determined that the file transfer rate had decreased with the addition of connection C3. In this case, the destination device may terminate connection C3 once the source device had completed transferring source file F5, rather than adding connection C4, and may have requested source file F6 via connection C1 or C2.

Once the source device has completed transferring the source files, the destination device may determine whether all requested source files were successfully received from the source device. If the destination device determines that one or more of the source files were not transferred successfully, the destination device may re-request the unsuccessfully transferred files.

In this way, a destination device may improve a file transfer between a source device and the destination device by using multiple connections and/or by dynamically adjusting the quantity of connections based on a file transfer rate associated with the file transfer. This may enable the destination device to increase the file transfer rate of the file transfer, thereby increasing an efficiency of the file transfer by decreasing the total file transfer time of the file transfer, thereby freeing communication resources for other tasks.

As indicated above, FIGS. 1A-1D are provided merely as an example. Other examples are possible and may differ from what was described with regard to FIGS. 1A-1D.

Figure 2:
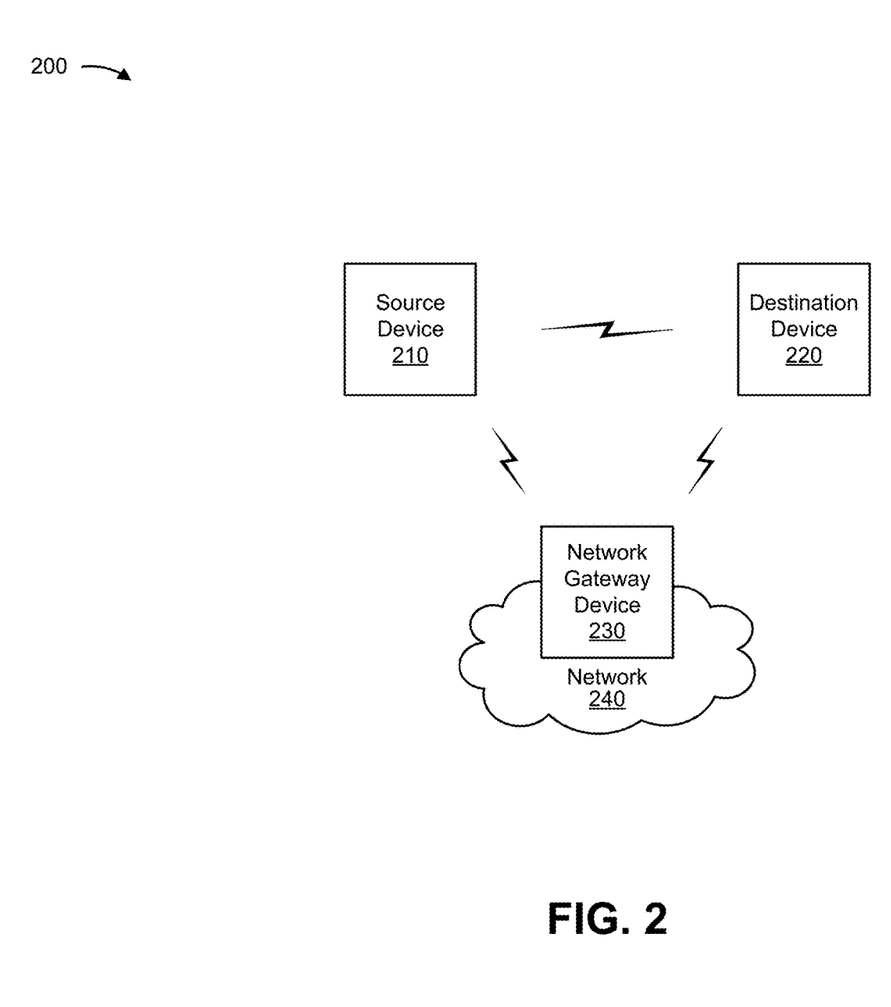
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 210, a destination device 220, a network gateway device 230, and a network 240. Devices of environment 200 may interconnect via wired connections, wireless connections, or a combination of wired and wireless connections.

Source device 210 includes one or more devices capable of transferring files or metadata to destination device 220. For example, source device 210 may include a communication and/or computing device, such as a mobile phone (e.g., a smart phone or a radiotelephone), a laptop computer, a tablet computer, a handheld computer, a personal gaming device, a wearable communication device (e.g., a smart wristwatch or a pair of smart eyeglasses), or a similar type of device. In some implementations, source device 210 may provide source metadata and/or files to destination device 220 (e.g., directly, such as via device-to-device communication, and/or via network gateway device 230), as described in more detail elsewhere herein.

Destination device 220 includes one or more devices capable of receiving files and/or metadata transferred from source device 210. For example, destination device 220 may include a communication and/or computing device, such as a mobile phone (e.g., a smart phone or a radiotelephone), a laptop computer, a tablet computer, a handheld computer, a personal gaming device, a wearable communication device (e.g., a smart wristwatch or a pair of smart eyeglasses), or a similar type of device. In some implementations, destination device 220 may receive source metadata and/or files from source device 210 (e.g., directly and/or via network gateway device 230), as described in more detail elsewhere herein.

Network gateway device 230 includes one or more devices capable of communicating wirelessly with local devices, such as source device 210 and/or destination device 220, and providing connectivity, for local devices, to devices connected to network 240. For example, network gateway device 230 may include a gateway, a wireless local area network (WLAN) access point, a router, a modem, a switch, a hub, a bridge, or a similar type of device. Network gateway device 230 may enable source device 210 and/or destination device 220 to connect and/or communicate (e.g., via network 240).

Network 240 includes one or more wired and/or wireless networks. For example, network 250 may include a public land mobile network (PLMN), a local area network (LAN), a WLAN (e.g., a Wi-Fi network), a wide area network (WAN), a metropolitan area network (MAN), a telephone network (e.g., a Public Switched Telephone Network (PSTN)), a private network, an ad hoc network, an intranet, the Internet, a fiber optic-based network, a cloud computing network, and/or a combination of these or other types of networks. In some implementations, source device 210 may access network 240 via network gateway device 230, and may communicate with destination device 220 via network 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
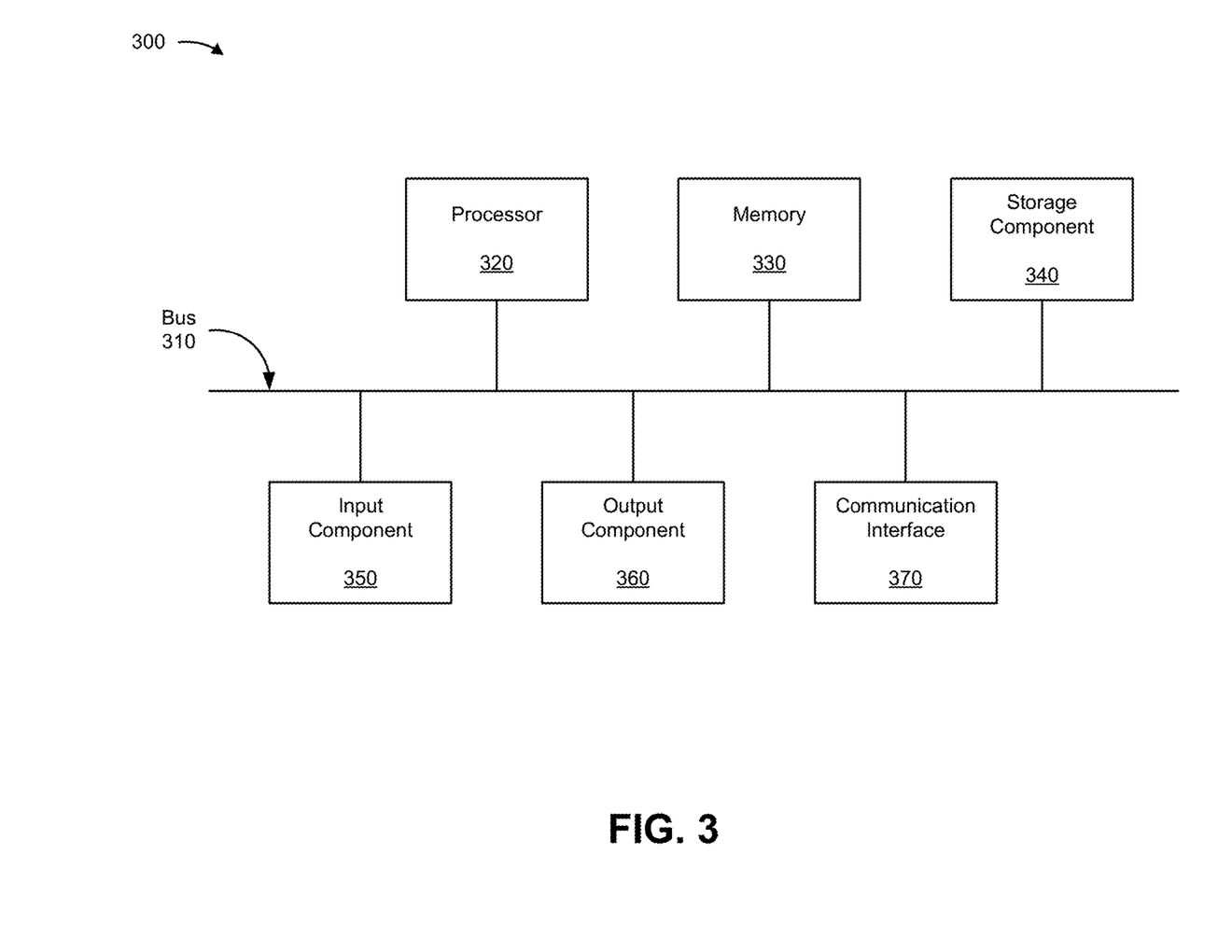
FIG. 3 is a diagram of example components of one or more devices of FIG. 2.

FIG. 3 is a diagram of example components of a device 300. Device 300 may correspond to source device 210, destination device 220, and/or network gateway device 230. In some implementations, source device 210, destination device 220, and/or network gateway device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
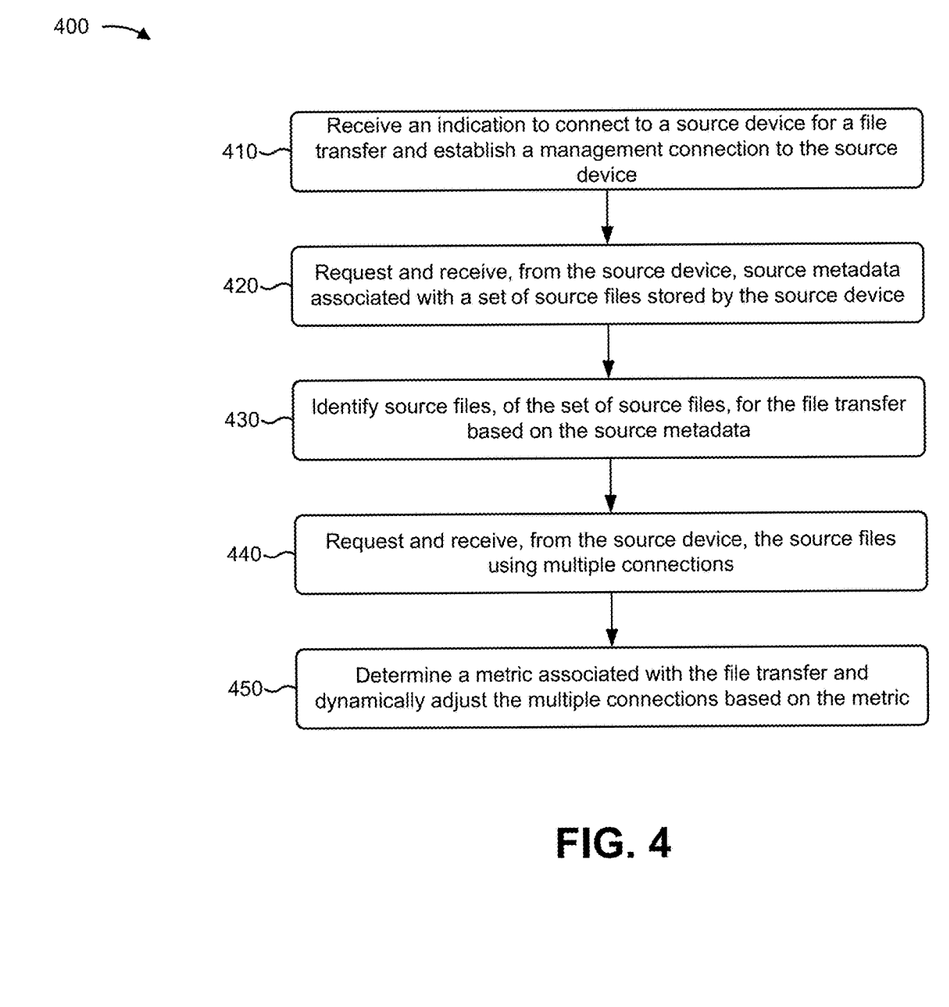
FIG. 4 is a flow chart of an example process for increasing an efficiency of a file transfer by using multiple communication resources.

FIG. 4 is a flow chart of an example process 400 for improving an efficiency of a file transfer by using multiple communication resources. In some implementations, one or more process blocks of FIG. 4 may be performed by destination device 220. In some implementations, one or more process blocks of FIG. 4 may be performed by another device or a group of devices separate from or including destination device 220, such as source device 210 and/or network gateway device 230.

As shown in FIG. 4, process 400 may include receiving an indication to connect to a source device for a file transfer and establishing a management connection to the source device (block 410). For example, destination device 220 may receive an indication to establish a communication session with source device 210 when a user interacts with source device 210 and/or destination device 220 to initiate a file transfer from source device 210 to destination device 220. In some implementations, destination device 220 may cause the management connection to be established with source device 210.

In some implementations, destination device 220 may establish the management connection with source device 210 via network gateway device 230. Additionally, or alternatively, destination device 220 may establish the management connection with source device 210 via a direct connection, such as a device-to-device connection. In some implementations, source device 210 and destination device 220 may authenticate the management connection with source device 210 to increase security. For example, source device 210 may generate a random password and provide the random password for display via a user interface associated with source device 210. In some implementations, the user may input the random password to destination device 220 (e.g., via a user interface associated with destination device 220), which destination device 220 may transmit to source device 210 for authentication.

As further shown in FIG. 4, process 400 may include requesting and receiving, from the source device, source metadata associated with a set of source files stored by the source device (block 420). For example, destination device 220 may request file identifiers associated with source files, such as source file names. As another example, destination device 220 may request file sizes of source files, such as a quantity of bytes. As another example, destination device 220 may request file paths of source files, such as locations of the source files on source device memory resources, which may enable destination device 220 to specify the locations of the source files on source device 210 when requesting the source files. As another example, destination device 220 may request file types of source files, such as audio, video, photo, SMS messages, or contact list. In some implementations, destination device 220 may request the source metadata via the management connection with source device 210.

In some implementations, destination device 220 may request all source metadata associated with the set of source files. Additionally, or alternatively, destination device 220 may request specific source metadata associated with the set of source files. For example, destination device 220 may request file identifiers, without requesting file sizes or file types. This conserves network resources by preventing source device 210 from transferring all source metadata associated with the set of source files.

In some implementations, source device 210 may identify the set of source files stored by source device 210 and determine the source metadata associated with the set of source files. In some implementations, source device 210 may provide the source metadata to destination device 220, which destination device 220 may use to request source files from source device 210, as described below.

As further shown in FIG. 4, process 400 may include identifying source files, of the set of source files, for the file transfer based on the source metadata (block 430). For example, destination device 220 may compare the source metadata, received from source device 210, to destination metadata, associated with destination files stored by destination device 220, to identify source files to request from source device 210. In some implementations, destination device 220 may use the source metadata to identify source files that are stored by source device 210 but not stored by destination device 220 and that, therefore, should be requested by destination device 220.

In some implementations, destination device 220 may use the source metadata to identify source files and destination files that share a file identifier but are otherwise different. For example, destination device 220 may use the source metadata to identify source files and destination files that share the same data identifier but have different file sizes. As another example, destination device 220 may use the source metadata to identify source files and destination files that share the same file identifier but where a particular destination file is damaged, corrupted, contains an error, or has a different modification timestamp than the same source file (e.g., information identifying a date and/or time of the last modification to the file).

In this way, destination device 220 may identify source files that are different from the destination files, thereby conserving communication resources when destination device 220 requests and receives the source files.

As further shown in FIG. 4, process 400 may include requesting and receiving, from the source device, the source files using multiple connections (block 440). For example, destination device 220 may request the source files from source device 210 by transferring source metadata that identifies the source files, such as file identifiers, to source device 210. In some implementations, destination device 220 may request the source files one source file at a time via each of the multiple connections (e.g., multiple communication sessions).

Alternatively, destination device 220 may request all of the source files at the same time, which increases an efficiency of the file transfer by enabling source device 210 to receive requests for all of the source files at one time (e.g., rather than receiving individual requests for the source files). In some implementations, destination device 220 may monitor which source files have been requested, which improves an efficiency of requesting the source files by preventing destination device 220 from requesting particular source files more than once.

In some implementations, source device 210 may identify the source files requested by destination device 220 using the source metadata received from destination device 220. In some implementations, source device 210 may store the source files that destination device 220 has requested in a single location, which may increase an efficiency of the file transfer by reducing an amount of time for source device 210 to locate requested source files. In some implementations, when source device 210 has identified the source files, source device 210 may transfer the source files to destination device 220.

In some implementations, destination device 220 may establish multiple connections with source device 210. For example, destination device 220 may establish multiple transmission control protocol/Internet protocol (TCP/IP) connections with source device 210. In some implementations, destination device 220 may establish a default quantity of multiple connections with source device 210 (e.g., three, four, or five connections).

In some implementations, destination device 220 may determine the quantity of connections based on the quantity of files being requested. For example, destination device 220 may determine the quantity of connections as a percentage of the quantity of files being requested. As another example, destination device 220 may establish a first connection for a first quantity of files requested and then establish an additional connection for each second quantity of files requested thereafter (e.g., establish a first connection for the first 10 files and then establish an additional connection for each additional five files requested after the first 10).

In some implementations, destination device 220 may establish the connections according to a time interval until all requested files have been transferred. For example, destination device 220 may establish a connection and then establish an additional connection every three seconds after establishing the connection. In some implementations, destination device 220 may establish the connections based on the size of the files being requested. For example, destination device 220 may establish a quantity of connections for a set files with sizes, or an average size, less a threshold size.

In some implementations, the multiple connections may be dedicated to the file transfer. For example, destination device 220 may establish multiple connections with source device 210 that are used only for the file transfer and are not used for other communications between source device 210 and destination device 220. This increases an efficiency of the file transfer and decreases the total file transfer time for the file transfer by preventing interruption of the file transfer by other communications.

In some implementations, destination device 220 may establish the multiple connections with source device 210 via network gateway device 230. In some implementations, destination device 220 may establish the multiple connections with source device 210 via a direct connection, such as a device-to-device connection. In some implementations, source device 210 and destination device 220 may authenticate the multiple connections with source device 210 to increase security. For example, source device 210 and destination device 220 may use the random password generated by source device 210 to authenticate the multiple connections.

In some implementations, destination device 220 may receive the source files from source device 210 via the multiple connections. For example, destination device 220 may receive multiple files simultaneously via the multiple connections. This decreases the total file transfer time for the file transfer from source device 210 by transferring multiple files simultaneously. In some implementations, destination device 220 may store a list (e.g., a central list or a master list) of which files have been received and/or are in the process of being received from source device 210. In some implementations, destination device 220 may use the list to determine the next file to be requested via each of the multiple connections, which improves an efficiency of the file transfer by preventing duplicate requests for a particular file.

In some implementations, when destination device 220 finishes receiving source files via one of the multiple connections, destination device 220 may request additional source files via the same connection. For example, destination device 220 may receive a first source file via a first file connection and a second source file via a second data connection. In this case, assuming that destination device 220 has established two connections with source device 210 and that source device 210 completes transferring the first source file before the second source file, destination device 220 may request a third source file via the first connection after destination device 220 has received the first source file from source device 210 and concurrently with receiving the second source file from source device 210.

In some implementations, destination device 220 may use the source metadata to determine when the file transfer for a particular source file is complete or near completion (e.g., within a threshold amount of time or file size from completion). For example, destination device 220 may use a file size of the source file to determine a percentage of the particular source file that has been received and/or a percentage of the particular source file that has not been received. This may enable destination device 220 to determine when a transfer of the particular source file has reached a threshold level of completion so that destination device 220 may request more files. This decreases the total file transfer time of the file transfer by reducing idle time of destination device 220 between when destination device 220 receives a source file and destination device 220 requests additional source files.

In some implementations, destination device 220 may receive the source files at a constant file transfer rate (e.g., the quantity of data transferred per unit of time, such as 1024 bytes per second, 480 megabytes per second, or 3 kilobytes per second). For example, destination device 220 may receive the particular file at a constant data transfer rate rather than at a variable data transfer rate. This improves the file transfer by preventing the connection from becoming overloaded with data.

In some implementations, source device 210 may determine a block size (e.g., a sequence of bytes or bits having a maximum length) for reading a source file from source device memory resources. In some implementations, source device 210 may determine the block size in association with transferring the source file to destination device 220 to use the block size as a read buffer when reading the source file from the source device memory resources.

In some implementations, source device 210 may determine the block size based on source metadata associated with the source file being transferred from source device 210 to destination device 220. For example, source device 210 may determine the block size based on a quantity of characters in the file identifier of the source file, based on a file size of the source file, or the like. In some implementations, source device 210 may determine the block size prior to transferring the source file to destination device 220. This increases a data transfer rate of the source file by determining an efficient block size for reading the source file from the source device memory resources.

In some implementations, source device 210 may adjust connection parameters associated with the connection being used for the file transfer. In some implementations, source device 210 may adjust the connection parameters by disabling transmission control protocol (TCP) parameters that increase latency during the file transfer. For example, destination device 220 and/or source device 210 may disable Nagle algorithm delay, where data packets, associated with the source files, are held and grouped prior to being transferred. This increases an efficiency of the file transfer by reducing latency associated with transferring the source file.

In some implementations, source device 210 may use a send socket buffer in association with the file transfer. In some implementations, source device 210 may configure a size of the send socket buffer for the file transfer. For example, source device 210 may configure a quantity of bytes for the size of the send socket buffer. In some implementations, source device 210 may configure a size of the send socket buffer that increases the likelihood that source device 210 will have source files to transfer to destination device 220, thereby reducing idle time of source device 210. For example, source device 210 may configure the size of the send socket buffer to 64 KB or 4 MB. This increases an efficiency of the file transfer by reducing the likelihood that source device 210 is without files to transfer to destination device 220 and is therefore idle. In addition, this increases network throughput by reducing the likelihood of idle network resources and/or underutilized network resources, such as bandwidth.

In some implementations, destination device 220 may use a receive socket buffer in association with the file transfer. In some implementations, destination device 220 may configure a size of the receive socket buffer for the file transfer. For example, destination device 220 may configure a quantity of bytes for the size of the receive socket buffer. In some implementations, destination device 220 may configure a size of the receive socket buffer that increases the likelihood that destination device 220 will have files to write to destination device memory resources, thereby reducing idle time of destination device 220. For example, destination device 220 may configure the size of the receive socket buffer to 64 KB or 4 MB. This increases an efficiency of the file transfer by reducing the likelihood that destination device 220 is without source files to write to the destination device memory resources and is therefore idle.

In some implementations, source device 210 and destination device 220 may use multiple threads of execution (e.g., independent sequences of programmed instructions) during the file transfer. For example, source device 210 may use multiple threads of execution to read multiple source files from the source device memory resources, to store the multiple source device files in the send socket buffer, and/or to transfer the multiple source files to destination device 220 via multiple connections. Similarly, for example, destination device 220 may use multiple threads of execution to write multiple source files from the receive socket buffer to destination device memory resources. This increases the file transfer rate and decreases the total file transfer time by using multiple threads of execution to transfer multiple source files simultaneously.

Source device 210 and/or destination device 220 may use one or more of the previously described communication resources alone or in combination to efficiently transfer files from source device 210 to destination device 220. In this way, source device 210 and/or destination device 220 may increase an efficiency of the file transfer and/or decrease the total file transfer time by using multiple communication resources, such as multiple buffers, multiple connections, and/or multiple threads of execution.

As further shown in FIG. 4, process 400 may include determining a metric associated with the file transfer and dynamically adjusting the multiple connections based on the metric (block 450). For example, destination device 220 may determine a data transfer rate associated with the file transfer and/or another metric associated with a performance of the file transfer. In some implementations, destination device 220 may provide information that identifies the data transfer rate for display to the user of destination device 220 (e.g., via a user interface associated with destination device 220).

In some implementations, destination device 220 may increase a quantity of connections between source device 210 and destination device 220. For example, assume that destination device 220 established four connections between source device 210 and destination device 220. In this case, destination device 220 may determine the data transfer rate associated with a file transfer via the four connections and then increase the quantity of connections to five by adding a fifth connection. In some implementations, destination device 220 may wait a threshold amount of time (e.g., 15 seconds, 30 seconds, 60 seconds) after increasing the quantity of connections and then re-determine the data transfer rate or other metric associated with the file transfer via the five connections.

In some implementations, when destination device 220 determines that the data transfer rate or other metric has improved, destination device 220 may maintain the additional connection. Additionally, or alternatively, destination device 220 may further increase the quantity of connections again (e.g., by adding a sixth connection). In some implementations, destination device 220 may wait the threshold amount of time after increasing the quantity of connections to six and re-determine the data transfer rate for the file transfer via the six connections. In some implementations, destination device 220 may continue this pattern unless destination device 220 determines that the data transfer rate has decreased (or decreased greater than a threshold) in association with increasing the quantity of connections.

In some implementations, when destination device 220 determines that the data transfer rate has decreased after increasing the quantity of connections, destination device 220 may terminate the additional connection. For example, destination device 220 may decrease the quantity of connections by terminating a connection after the file transfer associated with the connection has completed. For example, assume that the data transfer rate decreased in association with adding the sixth connection. In this case, destination device 220 may terminate the sixth connection once the file transfer via the sixth connection has completed.

In some implementations, destination device 220 may wait the threshold amount of time after terminating a connection and then re-determine the data transfer rate. For example, assuming that destination device 220 terminated the sixth connection, destination device 220 may wait the threshold amount of time and then re-determine the data transfer rate via the remaining five connections. In some implementations, destination device 220 may continue to terminate connections unless destination device 220 determines that the data transfer rate has increased after terminating a connection, at which point, destination device 220 may increase the quantity of connections by adding a connection (e.g., provided that source device 210 has not transferred all of the requested files or a threshold percentage of the requested files remain un-transferred).

In some implementations, destination device 220 may determine whether the source files have been successfully transferred from source device 210. For example, destination device 220 may determine whether the source files have been successfully transferred at the completion of the file transfer. In some implementations, destination device 220 may re-request particular source files if any errors have occurred during the data transfer.

In this way, destination device 220 increases a data transfer rate of a file transfer by increasing or decreasing a quantity of connections used for the file transfer based on determining whether the data transfer rate increases or decreases in association with increasing or decreasing the quantity of connections. While implementations are described above in connection with a data transfer rate, destination device 220 may use some other metric regarding performance of file transfer, such as an error rate (e.g., bit error rate or block error rate), a retransmission rate, a latency measurement, a jitter measurement, a file transfer success rate (e.g., an indication of a quantity of files that were successfully transferred, such as a percentage), or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable a file transfer between a destination device and a source device using multiple communication resources. In addition, the destination device may adjust a quantity of connections between the source device and the destination device based on a data transfer rate associated with the file transfer. This increases efficiency of the file transfer by increasing a data transfer rate and/or decreasing a total data transfer time for the file transfer. In addition, implementations described herein enable a file transfer between the source device and the destination device via direct communication and/or via a WLAN gateway device. This conserves network resources of a WAN, by transferring source file via the LAN and not the WAN.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, or equal to the threshold.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive an indication to connect to a source device for a file transfer;
receive, from the source device, metadata,
the metadata being associated with a set of files stored by the source device;
identify files, of the set of files, for the file transfer;
cause multiple connections with the source device to be established;
receive, from the source device, the files,
at least some of the files being received via the multiple connections established with the source device;
determine a first metric associated with the file transfer;
cause an adjustment to the multiple connections based on the first metric,
the adjustment causing a first additional connection with the source device to be established,
the first additional connection allowing another portion of the files to be received by the device; and
determine a second metric associated with the file transfer within a threshold amount of time after the first additional connection is established,
the first additional connection being maintained based on the second metric indicating an improvement in performance of the file transfer,
the first additional connection being terminated based on the second metric indicating a reduction in the performance of the file transfer.

2. The device of claim 1, where the one or more processors are further to:
cause a second additional connection with the source device to be established based on the second metric indicating an improvement in the performance of the file transfer.

3. The device of claim 1, where the first metric is a file transfer rate.

4. The device of claim 1, where the multiple connections include multiple transmission control protocol/Internet protocol (TCP/IP) connections with the source device.

5. The device of claim 1, where the metadata includes:
file identifiers associated with the files included in the set of files,
file sizes of the files included in the set of files, or
file types of the files included in the set of files.

6. The device of claim 1, where the one or more processors are to:
determine that one or more of the files were not received successfully; and
re-request the one or more of the files based on determining that the one or more of the files were not received successfully.

7. The device of claim 1, where the one or more processors, when causing the multiple connections with the source device to be established, are further to:
establish a first connection for a first quantity of files requested; and
establish a second connection for a second quantity of files requested after the first quantity of files.

8. The device of claim 7, where the first quantity of files is a different value than the second quantity of files.

9. The device of claim 1, where the one or more processors, when causing the multiple connections with the source device to be established, are further to:
establish the multiple connections with the source device according to a predetermined time interval,
each additional connection of the multiple connections being established according to the predetermined time interval after establishing a previous connection.

10. A non-transitory computer-readable medium storing instructions, the instructions comprising:
one or more instructions that, when executed by one or more processors, cause the one or more processors to:
receive an indication to establish a communication session between a first device and a second device for a file transfer;
receive, from the second device, metadata,
the metadata to be used to identify files of a set of files;

identify the files for transfer from the second device to the first device based on the metadata;
cause multiple communication sessions to be established between the first device and the second device,
the multiple communication sessions to be used to transfer the files from the second device to the first device; and
receive, from the second device, the files,
at least some of the files being received via the multiple communication sessions established with the second device;
determine a first metric associated with the file transfer;
cause an adjustment to the multiple communication sessions based on the first metric,
the adjustment causing an additional communication session with the second device to be established,
the additional communication session allowing another portion of the files to be received by the first device;
determine a second metric associated with the file transfer within a threshold amount of time after the additional communication session is established,
the additional communication session being maintained based on the second metric indicating an improvement in performance of the file transfer,
the additional communication session being terminated based on the second metric indicating a reduction in the performance of the file transfer.

11. The non-transitory computer-readable medium of claim 10, where the one or more instructions, when executed by the one or more processors, further cause the one or more processors to:
determine that one or more of the files were not received successfully; and
re-request the one or more of the files based on determining that the one or more of the files were not received successfully.

12. The non-transitory computer-readable medium of claim 10, where the one or more instructions, that cause the one or more processors to identify the files, cause the one or more processors to:
identify one or more of the files that are stored by the first device and the second device,
where the one or more of the files stored by the first device have a different file size than the one or more of the files stored by the second device; and
request the one or more of the files based on the one or more of the files stored by the first device and the one or more of the files stored by the second device having different file sizes.

13. The non-transitory computer-readable medium of claim 10, where the one or more instructions, that cause the one or more processors to identify the files, cause the one or more processors to:
identify one or more of the files stored by the first device and the second device,
where the one or more of the files stored by the first device are:
damaged,
corrupted,
contain an error, or
have a different modification timestamp than the one or more of the files stored by the second device; and
request the one or more of the files based on the one or more of the files being damaged, corrupted, containing the error, or having the different modification timestamp.

14. The non-transitory computer-readable medium of claim 10, where the one or more instructions, that cause the one or more processors to receive the files, cause the one or more processors to:
receive the files using multiple threads of execution,
the multiple threads of execution enabling the first device to receive multiple files simultaneously; and
write the files to memory resources associated with the first device.

15. The non-transitory computer-readable medium of claim 10, where the one or more instructions, that cause the one or more processors to receive the files, cause the one or more processors to:
receive the files via a receive socket buffer; and
write the files to memory resources from the receive socket buffer.

16. The non-transitory computer-readable medium of claim 10, where the first metric is a file transfer rate.

17. A method, comprising:
receiving, by a destination device, metadata associated with a set of files stored by a source device;
identifying, by the destination device and based on the metadata, one or more files, of the set of files, for a file transfer;
sending, by the destination device and to the source device, a request for the one or more files;
causing, by the destination device, multiple communication sessions to be established with the source device for the file transfer;
receiving, by the destination device and from the source device, at least some of the one or more files via the multiple communication sessions;
causing, by the destination device, an additional communication session to be established with the source device,
the additional communication session allowing another portion of the files to be received by the destination device;
determining, by the destination device, a metric associated with the file transfer after the additional communication session has been established; and
selectively maintaining or terminating the additional communication session or one of the multiple communication sessions based on the metric,
the additional communication session being maintained based on the metric indicating an improvement in performance of the file transfer,
the additional communication session being terminated based on the metric indicating a reduction in the performance of the file transfer.

18. The method of claim 17, where the one or more files are a subset of the set of files.

19. The method of claim 17, where the metric indicates a file transfer rate associated with receiving the one or more files.

20. The method of claim 17, where the multiple communication sessions include at least one transmission control protocol/Internet protocol (TCP/IP) communication session.

* * * * *